(12) United States Patent
Dijon et al.

(10) Patent No.: US 7,755,270 B2
(45) Date of Patent: Jul. 13, 2010

(54) CATHODE STRUCTURE WITH NANOTUBES FOR EMISSIVE SCREEN

(75) Inventors: Jean Dijon, Champagnier (FR); Pierre Nicolas, Saint Egreve (FR)

(73) Assignee: Commissariat a l'Energie Atomique, Paris (FR)

( * ) Notice: Subject to any disclaimer, the term of this patent is extended or adjusted under 35 U.S.C. 154(b) by 472 days.

(21) Appl. No.: 11/671,825

(22) Filed: Feb. 6, 2007

(65) Prior Publication Data
US 2007/0222357 A1 Sep. 27, 2007

(30) Foreign Application Priority Data
Feb. 22, 2006 (FR) .................................. 06 50601

(51) Int. Cl.
*H01J 1/62* (2006.01)
(52) U.S. Cl. .................. 313/495; 313/310; 313/311
(58) Field of Classification Search .................. 313/310, 313/311, 336, 495–497
See application file for complete search history.

(56) References Cited

U.S. PATENT DOCUMENTS

| | | | |
|---|---|---|---|
| 4,857,161 A | 8/1989 | Borel et al. | |
| 5,717,279 A * | 2/1998 | Imura | 313/336 |
| 6,917,147 B2 | 7/2005 | Dijon et al. | |
| 2004/0051468 A1 | 3/2004 | Wang et al. | |
| 2004/0256969 A1 | 12/2004 | Dijon et al. | |
| 2005/0001529 A1 | 1/2005 | Kang et al. | |
| 2006/0177602 A1 | 8/2006 | Dijon et al. | |

FOREIGN PATENT DOCUMENTS

| | | |
|---|---|---|
| EP | 1 225 613 A1 | 7/2002 |
| EP | 1 429 363 A2 | 6/2004 |
| FR | 2 593 953 | 8/1987 |
| FR | 2 836 279 | 8/2003 |

OTHER PUBLICATIONS

U.S. Appl. No. 12/518,661, filed Jun. 11, 2009, Nicolas et al.

* cited by examiner

*Primary Examiner*—Nimeshkumar D. Patel
*Assistant Examiner*—Mary Ellen Bowman
(74) *Attorney, Agent, or Firm*—Oblon, Spivak, McClelland, Maier & Neustadt, L.L.P.

(57) ABSTRACT

This invention relates to a triode type cathode structure comprising a cathode conductor (22), an electrical insulation layer (24) and a grid electrode (25), superposed on a support (21), the electrical insulation layer and the grid electrode comprising openings exposing at least one electron emitting element, electrically connected to the cathode conductor (22) and comprising nanotubes (28) made of an electron emitting material. The cathode structure comprises protective means preventing the longest nanotubes from coming into contact with the grid electrode (25).

13 Claims, 9 Drawing Sheets

CATHODE STRUCTURE WITH NANOTUBES FOR EMISSIVE SCREEN

TECHNICAL FIELD

The invention relates to a cathode structure with nanotubes that can be used in a field emission flat screen.

STATE OF PRIOR ART

A display device by cathodoluminescence excited by field emission comprises a cathode or electron emitting structure and a facing anode covered with a luminescent layer. The anode and the cathode are separated by a space in which a vacuum is created.

The cathode is either a source based on micro-tips, or is a source based on an emissive layer with a low threshold field. The emissive layer may be a layer of carbon nanotubes or other carbon based structures or based on other materials or multilayers (AlN, BN).

The cathode structure may be of the diode type or the triode type. Document FR-A-2 593 953 (corresponding to U.S. Pat. No. 4,857,161) discloses a process for manufacturing a cathodoluminescence display device excited by field emission. The cathode structure is of the triode type. The electron emitting material is deposited on a visible conducting layer at the bottom of the holes made in an insulating layer that supports an electron extraction grid.

Document FR-A-2 836 279 divulges a triode type cathode structure for an emissive screen. The cathode structure comprises an electrode forming a cathode electrically connected to an electron emitting material, an electrical insulation layer and a grid cathode, all superposed on a support. An opening formed in the grid electrode and an opening formed in the layer of electrical insulation expose the electron emitting material that is located in the central part of the opening of the grid electrode. The openings are in the form of a slot and the electron emitting material exposed by the slots is composed of elements aligned along the longitudinal axis of the slots.

The electron emitting material may be composed of nanotubes, for example carbon nanotubes.

FIG. 1 shows a diagrammatic sectional view of a triode type cathode structure as divulged by document FR-A-2 836 279. This figure shows a single emission element. The cathode structure is formed on a support 1. It comprises a cathode 2 supporting a resistive layer 3, an insulation layer 4 and a metallic layer 5 forming an electron extraction grid, all superposed on a support 1 The resistive layer 3 is exposed through a slot 6. Growth pads 7 are supported on the resistive layer 3, in the central part of the slot 6 and along the longitudinal axis of the slot. A single growth pad can be seen on the figure. The growth pads 7 are made of an electrically conducting material covered with a catalyst. They enable the growth of nanotubes 8, for example carbon nanotubes. Typically, one image element or pixel comprises a few tens or hundreds of pads arranged in parallel slots.

Considering the growth mode used, the lengths of the nanotubes and their orientations relative to the cathode vary. The result is that there can be some very long nanotubes that touch the grid at random. This is shown in FIG. 2 in which the nanotube 8' is in electrical contact with the grid 5. Such a contact produces several undesirable effects.

When the pixel is addressed, the grid potential is increased to the order of 80 V to 100 V relative to the cathode to create the electric field at the end of the nanotube, this field being used for extraction of electrons. Since nanotubes are good electrical conductors, if one of them touches the grid, the pad on which the nanotubes are supported is brought to the same potential as the grid (due to the resistive layer between the cathode and the pad), and emission stops. The number of pads short circuited to the grid varies at random from one pixel to the next, causing a non-negligible pixel-to-pixel brightness variation considering the relatively small number of pads per pixel.

This grid cathode short circuit is limited by the presence of the resistive layer. Nevertheless, if the number of short circuited pads is not very small, there will be a leakage current between the grid and the cathode that increases the consumption of the device and can even prevent it from functioning if it is too high.

It is also desirable to increase the thickness of the insulation between the cathode and the grid to reduce the line column capacitance and reduce consumption of the screen. Due to its intrinsic divergence, the method of depositing the catalyst by cathode sputtering or evaporation tends to increase the width of the catalyst pad when the insulation thickness increases. FIGS. 3A and 3B illustrate the method of depositing the catalyst on growth pads when the thickness of insulation between the cathode and the grid increases. On these figures, the same references as on FIG. 1 represent the same elements. On FIG. 3A, the thickness of the insulation 4 is the same as on FIG. 1. On FIG. 3B, the insulation layer reference 4' is thicker than on FIG. 1. The catalyst is deposited on the pad 7 through an opening 11 provided in a layer of lift-off resin 10 deposited on the cathode structure, the opening 11 facing the pad 7. On FIG. 3A, the catalyst is deposited on the pad 7 following the catalyst evaporation cone 12. On FIG. 3B, the catalyst is deposited on the pad 7' following the evaporation cone 12'. Since the bottom of the cone 12' is wider than the bottom of the cone 12, the catalyst pad 7' is wider than the catalyst pad 7. Consequently, bringing the nanotubes deposited afterwards closer to the edge of the grid will cause a large increase in leakage currents. Therefore this cathode structure according to known art is not optimized for leakage currents.

SUMMARY OF THE INVENTION

The invention divulges a cathode structure capable of optimizing leakage currents.

Therefore, the purpose of the invention is a triode type cathode structure comprising a cathode conductor, an electrical insulation layer and a grid electrode superposed on a support, the electrical insulation layer and the grid electrode comprising openings exposing at least one electron emitting element, electrically connected to the cathode conductor and comprising nanotubes made of an electron emitting material, the openings in the electrical insulation layer and in the grid electrode being sized so as to allow at least one area of the electrical insulation layer not covered by the grid electrode to subsist, characterized in that a resistive layer at least partially covers part of the electrical insulation layer not covered by the grid electrode.

The opening width in the electrical insulation layer may be sufficiently small to guide the nanotubes in a direction perpendicular to the support.

A resistive layer can cover at least part of the grid electrode. Said resistive layer can extend at least vertically in line with the opening in the grid electrode.

The grid electrode may be located on the resistive layer.

According to one embodiment, the thickness of the electrical insulation layer is approximately equal to the average length of the nanotubes.

According to another embodiment, the edge of the electrical insulation close to its opening is thicker than the remainder of said layer. The edge of the electrical insulating layer may be between the opening in the electrical insulation layer and the opening in the grid electrode.

Advantageously, said electron emitting element is electrically connected to the cathode conductor through a resistive protection layer.

According to one particular embodiment, the electrical insulation layer comprises at one slot-shaped opening approximately parallel to a corresponding slot-shaped opening in the grid electrode.

According to another particular embodiment, the opening in the grid electrode is in the shape of a slot and exposes at least one row of electron emitting elements aligned in the direction of the slot.

An opening in the grid electrode can reveal a plurality of openings in the electrical insulation layer, aligned in at least one row approximately parallel to the opening in the slot-shaped grid electrode.

Each opening in the electric insulation layer may reveal at least one electron emitting element.

Another purpose of the invention is a flat field emission screen, comprising a plurality of cathode structures like those defined above.

BRIEF DESCRIPTION OF THE DRAWINGS

The invention will be better understood and other advantages and specific features will become clearer after reading the description given below as a non-limitative example, accompanied by the appended drawings, wherein.

DETAILED PRESENTATION OF PARTICULAR EMBODIMENTS

Figure 1:
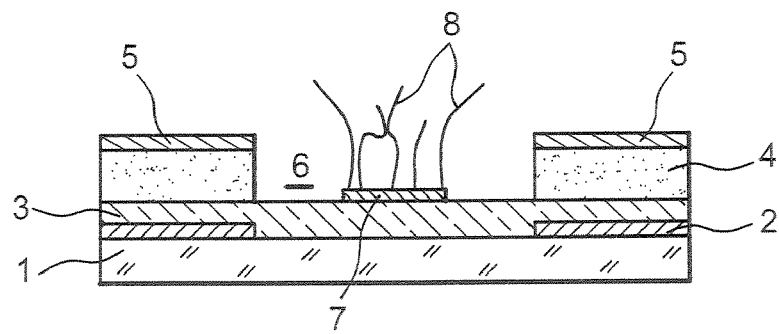
FIG. 1 is a sectional view representing a triode type cathode structure using nanotubes as the electron emitting material, according to prior art.
Figure 2:
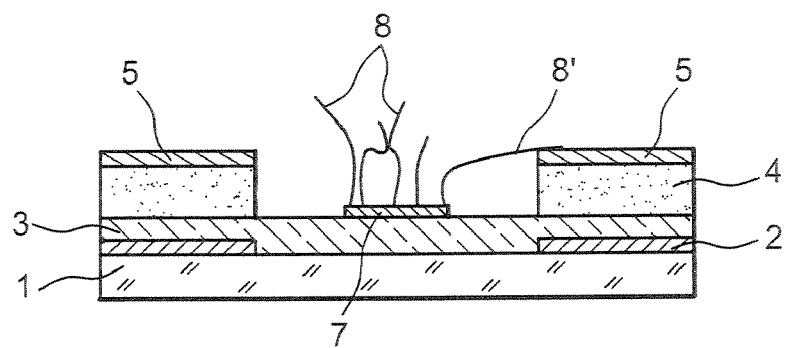
FIG. 2 represents the structure of the cathode in FIG. 1 in which a nanotube is short circuited with the grid.
Figure 3A:
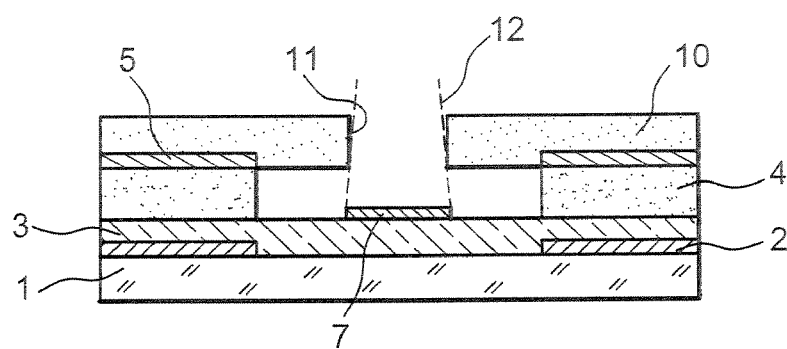
FIGS. 3A and 3B are illustrations of the method of depositing a catalyst on growth pads for a cathode structure of the type shown in FIG. 1.
Figure 3B:
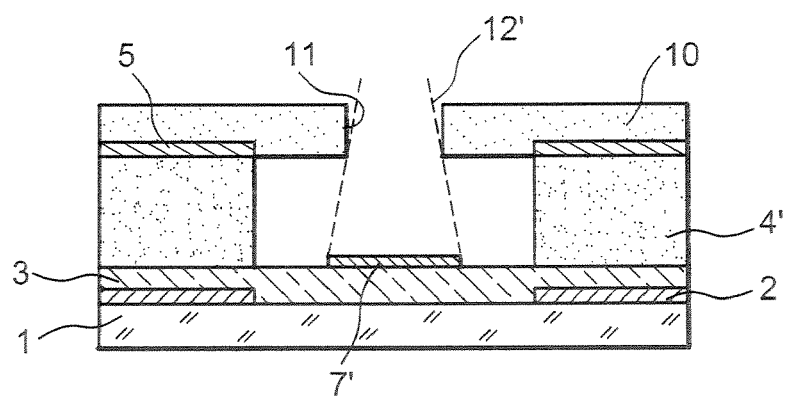

The example embodiments that are described below as an example relate to a cathode structure with nanotubes comprising an opening formed in the electrode and a corresponding opening formed in the electrically insulating layer exposing electron emitting elements. The openings are shaped liked slots with coincident longitudinal center lines, and the electron emitting elements are aligned along this center line. This arrangement is like that described in document FR-A-2 836 279, as illustrated in FIGS. 1 and 2 described above.

Figure 4:
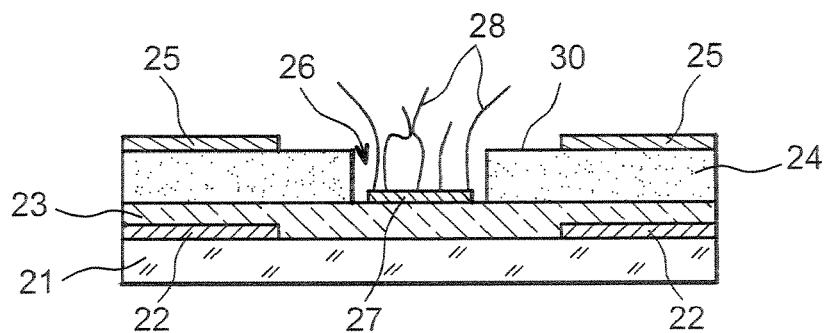
FIG. 4 is a sectional view illustrating a first cathode structure with nanotubes according to this invention.

FIG. 4 is a sectional view illustrating a first cathode structure with nanotubes according to this invention. A single electron emitting element is shown. The cathode structure is formed on a support 21. It comprises a cathode 22 supporting a resistive layer 23, an insulating layer 24 and an electron extraction grid 25, superposed on the support 21. Openings are formed in the metallic layer supplying the grid 25 and in the electrical insulation layer 24. The result is a slot 25 exposing the resistive layer 23 on which a conducting growth pad 27 was formed. Reference 28 represents nanotubes, for example made of carbon, that were developed on the growth pad 27.

The probability of contact between the nanotubes 28 and the grid 25 was minimized by bringing the electrical insulation 24 close to the growth pads 27. The effect of bringing them closer is to guide the nanotubes over part of their length making it more difficult to come into contact with the grid electrode for which the opening size did not vary.

However, the presence of an insulating surface like surface 30 facing an anode can be the source of serious unreliability due to an accumulation of electrical charges on the insulation. This accumulation of charges can cause destructive electric arcs between the cathode and the anode. This problem can be overcome by covering the electrical insulation with a layer of resistive material, shown as reference 31 on FIG. 5. If the layer 31 extends on the grid 25, the layer of resistive material 31 can also eliminate the short circuit effect of the nanotubes that could still possibly touch the grid 25. Advantageously, the resistance of the resistive layer 31 is such that the divider bridge created by the resistive layers 31 and 23 being put into series leads to a potential on the pad 27 being similar to the potential on the cathode 22. This means that the resistance of the layer 31 is typically between 10 and 100 times greater than the resistance of the resistive ballast layer 23, namely of the order of $10^9$ to $10^{10}$ ohms par square compared with $10^8$ ohms par square for the ballast resistive layer 23.

Figure 5:
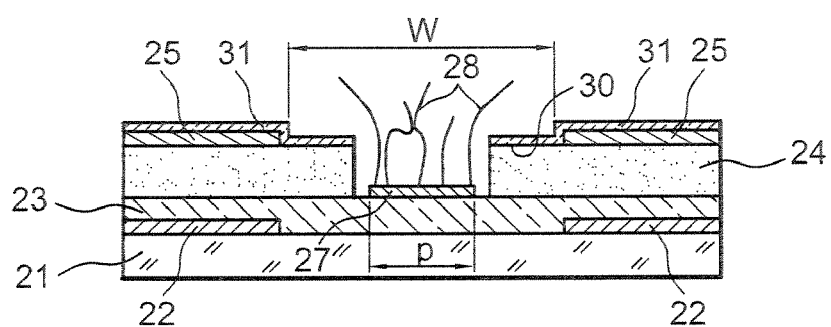
FIG. 5 is a sectional view illustrating a second cathode structure with nanotubes according to this invention.

The distance between the edge of the grid 25 and the opening formed in the insulating layer 24 is adjustable from a few tens of nm to (W−p)/2, where W is the width of the grid opening and p is the width of the growth pad 27 (see FIG. 5). Typically, W=10 μm and p=5 μm.

Figure 6:
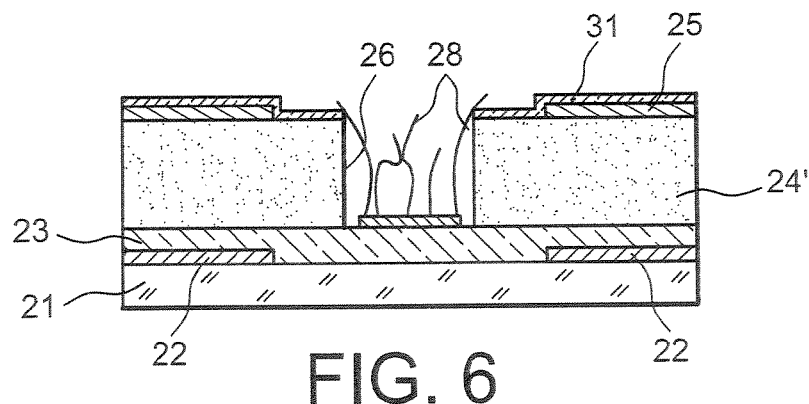
FIG. 6 is a sectional view illustrating a third cathode structure with nanotubes according to this invention.

According to another variant embodiment, the thickness of the electrical insulating layer can be increased such that the average length of the nanotubes is for example equal to the thickness of the insulating layer. This is shown on FIG. 6, in which elements that are the same as the elements on FIG. 5 have the same references, except for the insulating layer 24' that is thicker than the insulating layer 24 in FIG. 5.

In a cathode structure, the thickness of the insulating layer may be chosen so as to reduce the capacity of the device incorporating the cathode structure, independently of considerations about the length of the nanotubes. The invention provides a good solution to the problem of the nanotubes becoming closer to the grid when the thickness of the electrical insulation layer increases. The catalyst can partially cover the sides of the opening formed in the insulation layer without creating any short circuit problems.

Figure 7:
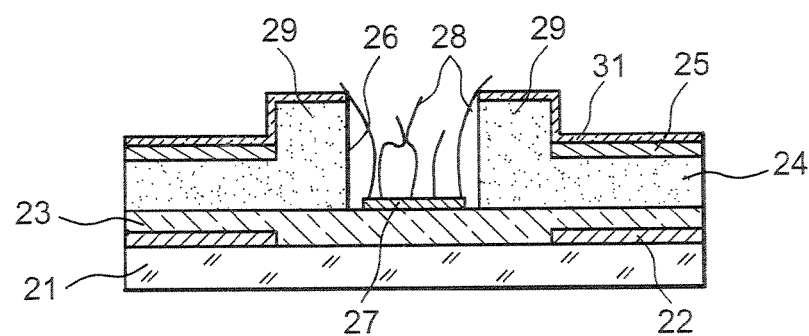
FIG. 7 is a sectional view illustrating a fourth cathode structure with nanotubes according to this invention.
Figure 8:
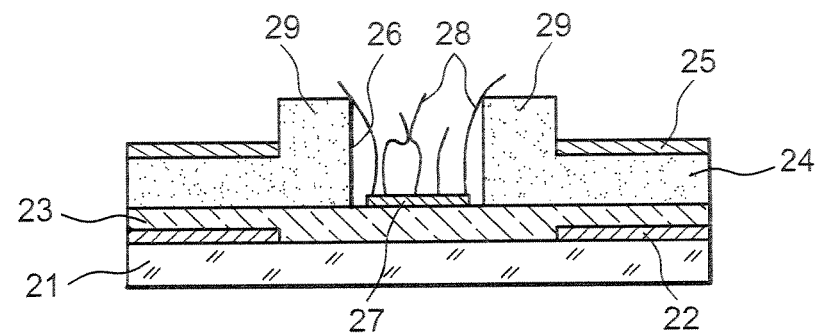
FIG. 8 is a sectional view illustrating a fifth cathode structure with nanotubes according to this invention.

According to another embodiment, the thickness of the electrical insulation layer can be increased only close to the nanotubes. This is shown on FIG. 7 in which elements identical to those in FIG. 5 have the same references. Reference 29 denotes the part of the electrical insulation layer with increased thickness. On FIG. 7, the part 29 is included between the opening of the grid and the opening in the electrical insulation. The resistive layer 31 might only partially cover the electrical insulation layer. It may also be completely absent as shown on FIG. 8, in which elements identical to those in FIG. 7 have the same references.

One of the advantages provided by the invention, apart from solving the leakage current problem, is the improved efficiency of the structure in terms of the electrical field created at the tip of the nanotubes. The grid potential is made more similar to the nanotubes due to the resistive layer 31 present on the grid 25, therefore the induced field is higher for a given voltage.

Figure 9:
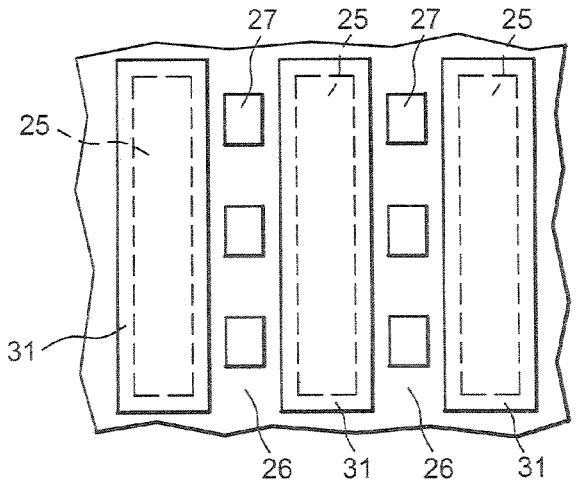
FIGS. 9 to 11 are top views of cathode structures with nanotubes according to the invention, showing different patterns of grids that can be used.
Figure 10:
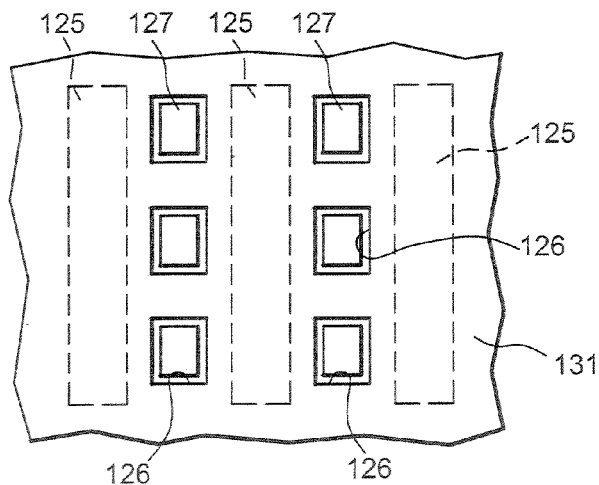
Figure 11:
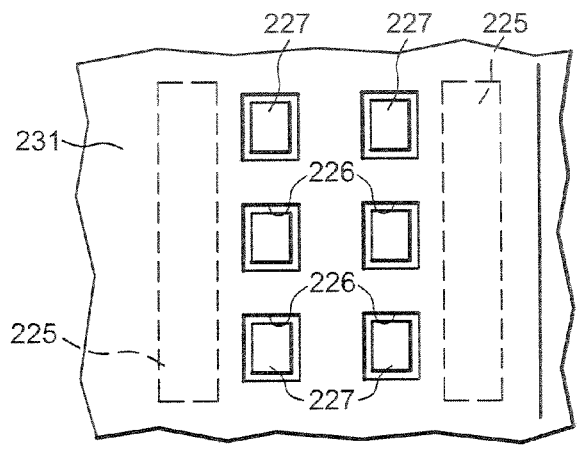

FIGS. 9, 10 and 11 are top views of cathode structures with nanotubes according to the invention, showing different patterns of grids that can be used.

FIG. 9 is a top view corresponding to the variant embodiment shown on FIG. 5. This figure shows the nanotube growth pads 27, arranged aligned along the longitudinal center line of the slots 26. The grid conductors 25 can also be recognized under the layers of resistive material 31. The openings in the resistive layer are slots (vertically in line with openings in the insulation), with each slot comprising a plurality of pads 27.

FIG. 10 is a top view showing another pattern for a cathode structure according to the invention. In this case, the growth pads 127 of the nanotubes are formed in wells 126, with one pad per well. The wells correspond to openings made in the resistive layer and the insulation layer. In this example, they are located at equal distances from the adjacent grid conductors 125. The resistive layer also covers the grid conductors. One of the advantages of this structure is that its consumption is lower than the structure in FIG. 9. The grid potential is similar to the nanotubes due to the resistive layer. A lower voltage can be applied to obtain an equivalent field.

FIG. 11 is a top view showing yet another pattern for a cathode structure according to the invention. In this case, two rows of nanotube growth pads 227 are formed in the wells, with one pad per well. The wells correspond to openings made in the resistive layer and the insulating layer. There are two successive rows of pads between a first grid conductor 225 and a second grid conductor 225. The presence of the resistive layer around each pad enables application of the grid voltage around the pad. This variant can result in a greater filling ratio of the area with pads. A greater number of pads per pixel or a better uniformity of the screen and a higher current can be obtained.

FIGS. 12A to 12G are sectional views illustrating a method for making a cathode structure with nanotubes according to the invention.

Figure 12A:
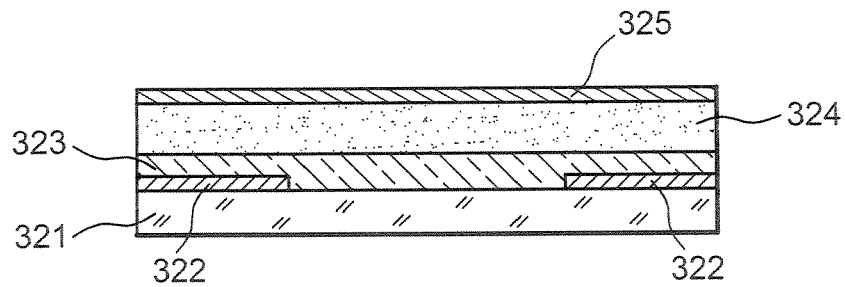
FIGS. 12A to 12G are sectional views illustrating a process for making a cathode structure with nanotubes according to the invention.

FIG. 12A shows a support 321, for example made of glass, on which cathode conductors 322 are made by deposition and etching operations. These cathode conductors may be made of molybdenum, copper or a tungsten and titanium alloy. For example, they form the columns of a display screen. A resistive protective layer 323 (or ballast layer) is deposited on the stack obtained, for example consisting of an amorphous silicon layer between 0.5 μm and 2 μm thick. An insulating layer 324 is then deposited, for example a silica layer between 1 μm and 3 μm thick. Finally a conducting grid layer 325 is then deposited, for example made of molybdenum or copper.

Figure 12B:
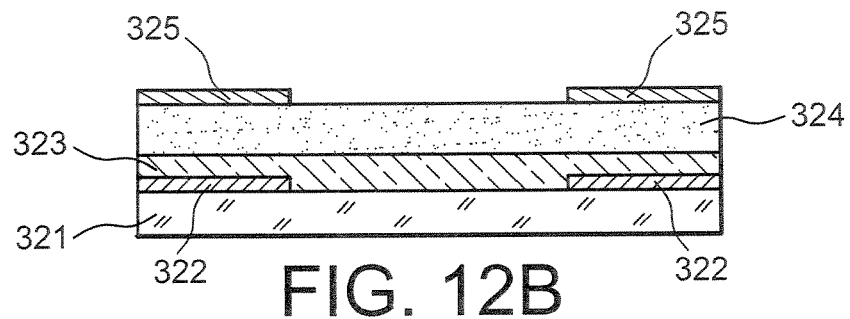
Figure 12C:
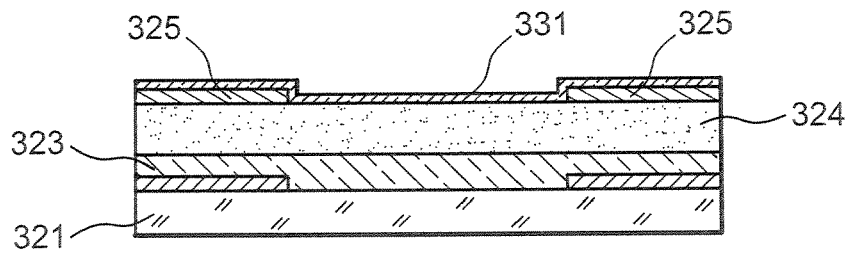
Figure 12D:
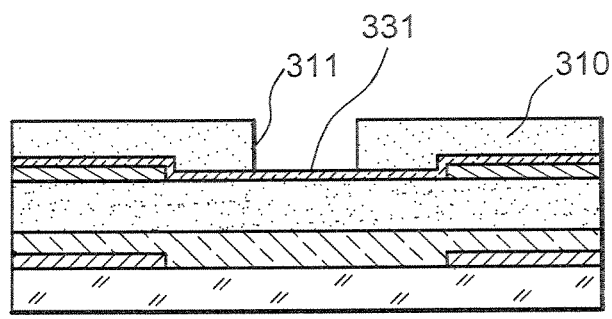

The conducting grid layer 325 is etched to form openings in the grid conductors and reveal the insulating layer 324 (see FIG. 12B).

A resistive layer 331 is then deposited on the grid conductors 325 and the revealed part of the insulating layer 324 (see FIG. 12C) The resistive layer 331 may be a highly resistive amorphous silicon layer or a DLC (<<Diamond Like Carbon>>) layer. If this layer is made of amorphous silicon, its resistivity is at least 10 times higher than the resistivity of the ballast layer and it is a few hundred nm thick, so that its electric resistance is 100 times higher than the resistance of the ballast layer.

A resin layer 310 is then deposited on the structure obtained. An opening 311 is formed in the resin layer at the center of the grid opening so as to reveal the resistive layer 331. The dimension of the opening 311 is adapted to the dimension of the growth pad to be made (see FIG. 12D).

Figure 12E:
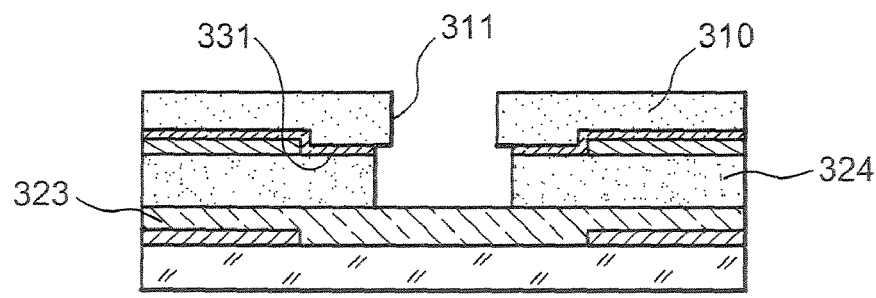
Figure 12F:
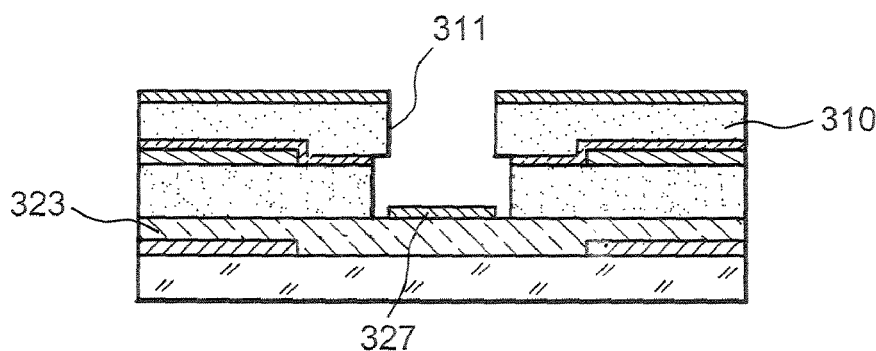

The resistive layer 331 and the electrical insulation layer 324 are etched through the opening 311 in the resin layer 310, to expose the ballast layer 323 (see FIG. 12E). The insulation layer 324 and the resistive layer may be over etched as shown on FIG. 12E.

A pad 327 (metal and catalyst) is deposited at the bottom of the opening formed in the electrical insulation layer, once again through the opening 311, on the ballast layer 323 (see FIG. 12F) The pads are typically 5 μm×5 μm.

Figure 12G:
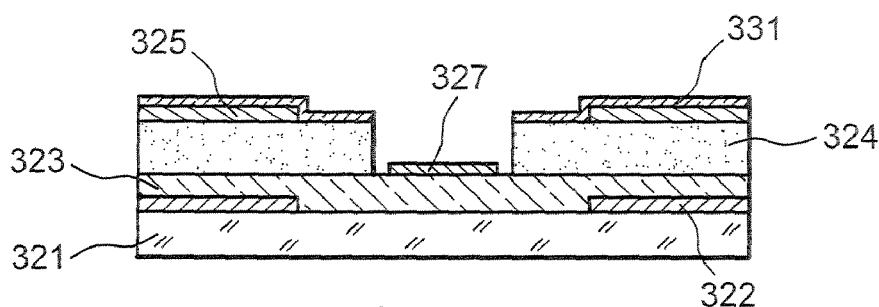

The resin layer is then eliminated by a <<lift-off >>technique to provide the structure shown in FIG. 12G. The next step could then be the growth of nanotubes on the pad 327.

The resistive layer may possibly be located under the grid conductors. This case might be possible when the grid is sufficiently setback so that nanotubes cannot short circuit the grid conductors. The problem of accumulation of electrical charges on the insulation must be overcome.

Figure 13:
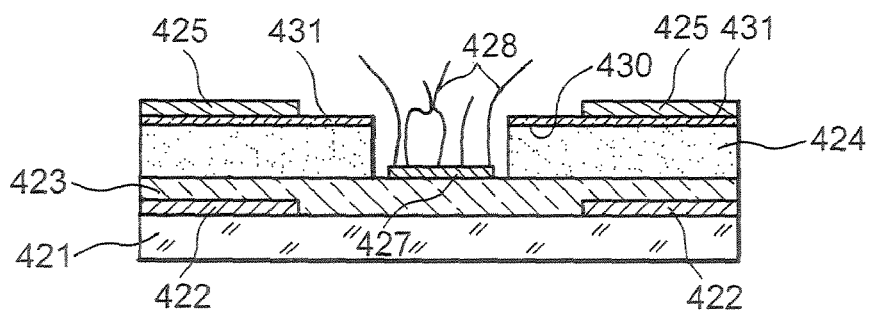
FIG. 13 is a sectional view illustrating another cathode structure with nanotubes according to this invention.

FIG. 13 is a sectional view illustrating such a cathode structure with nanotubes according to this invention. On this figure, elements the same as those shown on FIG. 5 have the same numbers plus 400. On FIG. 13, the resistive layer 431 is located under the grid conductors 425 as far as vertically in line with the slot made in the electrical insulation.

Figure 14:
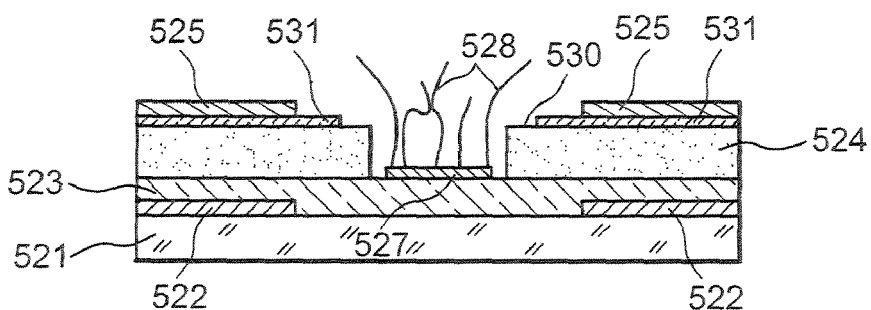
FIG. 14 is a sectional view illustrating yet another cathode structure with nanotubes according to this invention.

FIG. 14 is a sectional view illustrating another cathode structure with nanotubes according to this invention. On this figure, elements the same as those shown on FIG. 5 have the same numbers plus 500. FIG. 14 shows that, as above, the resistive layer 531 is under the grid conductors 525 and that it is setback from the slot made in the electrical insulation.

Figure 15A:
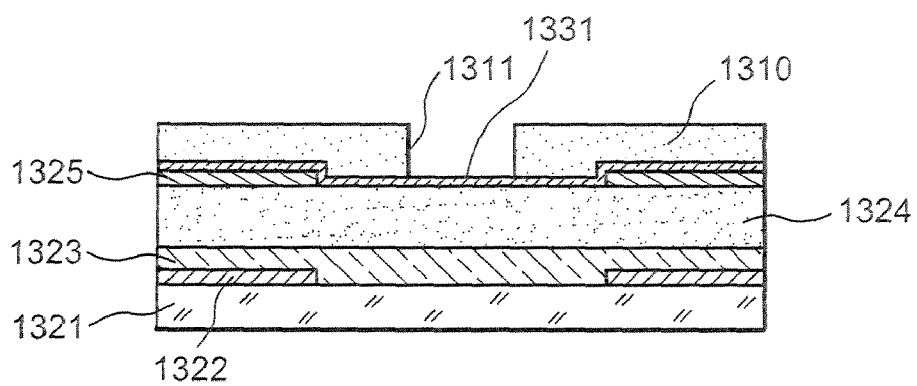
FIGS. 15A to 15G are sectional views illustrating a process for making another cathode structure with nanotubes according to the invention.

FIGS. 15A to 15G are sectional views illustrating a process for manufacturing another cathode structure with nanotubes according to the invention. The resistive layer of this cathode structure is on the grid conductors and this resistive layer is setback from the slot made in the electrical insulation. On FIGS. 15A to 15G, elements the same as those shown on FIGS. 12A to 12G have the same numbers plus 1000. The first steps in the process are identical to the first steps in the process illustrated in FIGS. 12A to 12G and therefore will not be shown. Thus, FIG. 15A is identical to FIG. 12D.

Figure 15B:
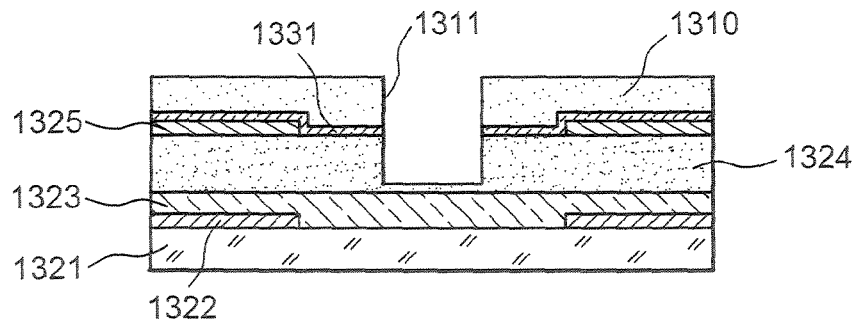

The resistive layer 1331 for example made of silicon, and the electrical insulation layer 1324 for example made of $SiO_2$, are etched through the opening 1311 in the resin layer 1310, using an RIE (reactive ion etching) technique without reaching the lower level of the electrical insulation layer 1324 (see FIG. 15B).

Figure 15C:
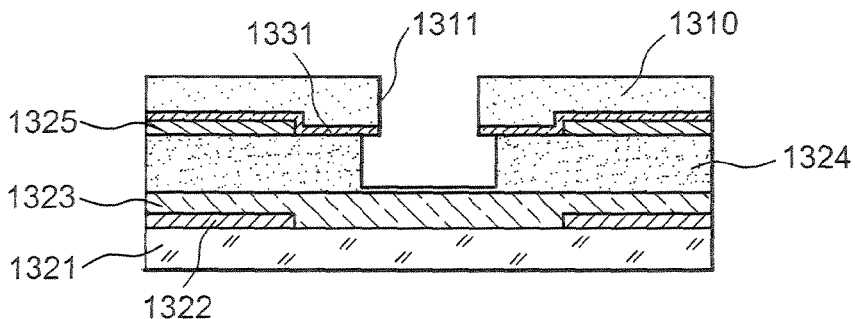
Figure 15D:
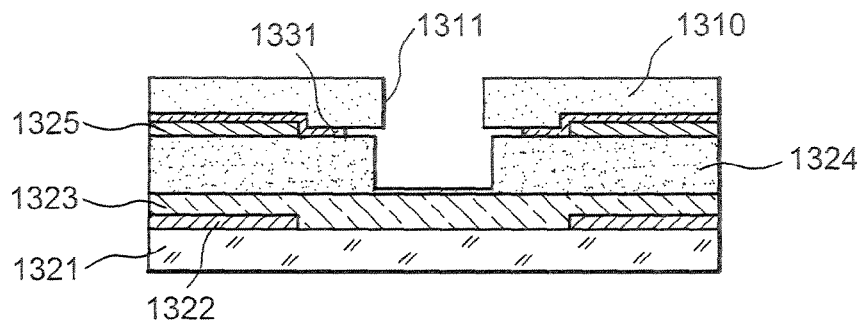
Figure 15E:
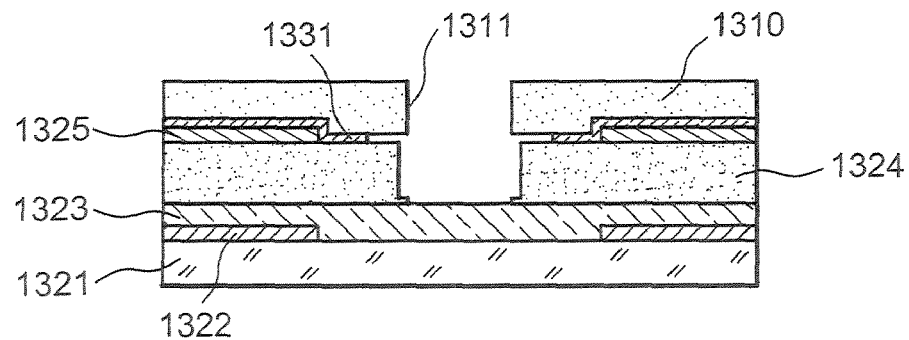

The next step is chemical etching of the electrical insulation layer 1324 to set back the insulation from the resistive layer 1331 while keeping a protective electrical insulation layer at the bottom of the opening 1311 (see FIG. 15C).

The next step is over etching of the resistive layer 1331 by chemical etching. If the resistive layer 1331 is made of silicon, chemical etching can be done using a mix of $HNO_3$ (50% by volume), HF (1% by volume) and $H_2O$ (49% by volume). The layer 1331 is then setback from the opening made in the electrical insulation layer 1324 (see FIG. 15D).

The next step is etching of the bottom of the opening formed in the electrical insulation layer 1324 until the ballast layer 1323 is exposed, for example by etching using an RIE technique. The structure obtained is illustrated on FIG. 15E. Wet etching could have been used to etch the bottom of the opening formed in the electrical insulation layer.

Figure 15F:
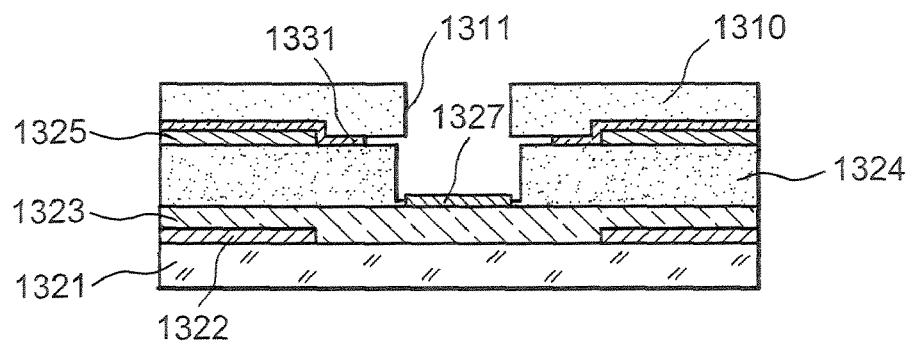

A pad 1327 (metal and catalyst) is deposited at the bottom of the opening formed in the electrical insulation layer 1324, through the opening 1311, on the ballast layer 1323 (see FIG. 15F).

Figure 15G:
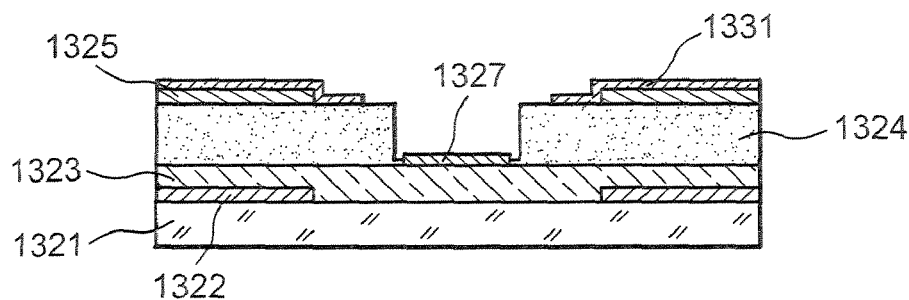

The resin layer is then eliminated using a <<lift-off>>technique to provide the structure shown in FIG. 15G. Nanotubes can then be grown on the pad 1327.

The invention claimed is:

1. A triode type cathode structure comprising a cathode conductor, an electrical insulation layer and a grid electrode, superposed on a support, the electrical insulation layer and the grid electrode comprising openings exposing at least one electron emitting element, electrically connected to the cathode conductor and comprising nanotubes made of an electron emitting material, the openings in the electrical insulation layer and in the grid electrode being sized so as to allow at least one area of the electrical insulation layer not covered by the grid electrode to subsist, wherein a resistive layer at least partially covers the part of the electrical insulation layer not covered by the grid electrode, wherein said electron emitting element is electrically connected to the cathode conductor through a resistive protection layer.

2. The cathode structure set forth in claim 1, in which the opening width in the electrical insulation layer is sufficiently small to guide the nanotubes in a direction perpendicular to the support.

3. The cathode structure set forth in claim 1, in which the resistive layer covers at least part of the surface of the grid electrode covering the electrical insulation layer.

4. The cathode structure set forth in claim 3, in which said resistive layer extends at least vertically in line with the opening in the grid electrode.

5. The cathode structure set forth in claim 1, in which the grid electrode is located on the resistive layer.

6. The cathode structure set forth in claim 1, in which the thickness of the electrical insulation layer is approximately equal to the average length of the nanotubes.

7. The cathode structure set forth in claim 1, in which the edge of the electrical insulation close to its opening is thicker than the remainder of said layer.

8. The cathode structure set forth in claim 7, in which the edge of the electrical insulating layer is between the opening in the electrical insulation layer and the opening in the grid electrode.

9. The cathode structure set forth in claim 1, in which the electrical insulation layer comprises at least one slot-shaped opening substantially parallel to a corresponding slot-shaped opening in the grid electrode.

10. The cathode structure set forth in claim 1, in which the opening in the grid electrode is in the shape of a slot and exposes at least one row of electron emitting elements aligned in the direction of the slot.

11. The cathode structure set forth in claim 9, in which an opening in the grid electrode reveals a plurality of openings in the electrical insulation layer, aligned in at least one row substantially parallel to the opening in the slot-shaped grid electrode.

12. The cathode structure set forth in claim 11, in which each opening in the electric insulation layer reveals at least one electron emitting element.

13. A flat field emission screen, comprising a plurality of cathode structures set forth in claim 1.

\* \* \* \* \*